(12) United States Patent
Liu et al.

(10) Patent No.: US 6,631,436 B1
(45) Date of Patent: Oct. 7, 2003

(54) PLATFORM FOR SELECTIVELY PROVIDING A CHANNEL SERVICE UNIT/DATA SERVICE UNIT, A ROUTER/BRIDGE, AND A DIAL-UP MODEM

(75) Inventors: Sheng-Wei Liu, San Chung (TW); Tsai-Kuen Chan, San Chung (TW)

(73) Assignee: Comptrend Compound, Taipei Hsien (TW)

( * ) Notice: Subject to any disclaimer, the term of this patent is extended or adjusted under 35 U.S.C. 154(b) by 482 days.

(21) Appl. No.: 09/652,885

(22) Filed: Aug. 31, 2000

(51) Int. Cl.[7] .............................................. G06F 13/00
(52) U.S. Cl. ........................................ 710/305; 375/222
(58) Field of Search .............................. 710/12, 14, 22, 710/300, 301, 105, 305, 308, 317; 709/250; 711/105; 375/222; 379/88.17, 88.13, 93.14, 100.12, 900, 908, 74; 370/908, 910, 911

(56) References Cited

U.S. PATENT DOCUMENTS

| | | | | |
|---|---|---|---|---|
| 4,885,741 A | * | 12/1989 | Douskalis | |
| 5,355,507 A | * | 10/1994 | Nishikawa | |
| 5,408,614 A | * | 4/1995 | Thornton et al. | |
| 5,581,606 A | * | 12/1996 | Gineys | |
| 6,434,634 B1 | * | 8/2002 | Cheng | |

* cited by examiner

Primary Examiner—Gopal C. Ray
(74) Attorney, Agent, or Firm—Rosenberg, Klein & Lee

(57) ABSTRACT

A universal modem platform has different modems integrated therein for matching the protocols of telephone and data communications. The circuit structure of the universal modem platform primarily comprises a mother board and a plurality of baby boards. The mother board has a processing unit, a bit-stream/PCM converter, a cross switch, and high level data link controls. The baby board slot connectors connect the mother board with the baby boards through the cross switch, the bit-stream/PCM converter, and the high level data link controls.

8 Claims, 18 Drawing Sheets

| Pin No. | I/O | Name | Pin No. | I/O | Name |
|---|---|---|---|---|---|
| 1 | O | TDO_S | 2 | O | TCLK_S |
| 3 | O | T8K_S | 4 | I | TC_T |
| 5 | I | RDI_S | 6 | I | RCLK_S |
| 7 | I | R8K_S | 8 | I | LOOP |
| 9 | | | 10 | O | SYS_CLK |
| 11 | | | 12 | I | EXIST# |
| 13 | | | 14 | | |
| 15 | O | RST# | 16 | I | INT1# |
| 17 | O | ALE | 18 | I | INT0# |
| 19 | I | READY | 20 | O | CS2# |
| 21 | O | WR# | 22 | O | CS1# |
| 23 | O | RD# | 24 | O | CS0# |
| 25 | I/O | AD7 | 26 | I/O | AD6 |
| 27 | I/O | AD5 | 28 | I/O | AD4 |
| 29 | I/O | AD3 | 30 | I/O | AD2 |
| 31 | I/O | AD1 | 32 | I/O | AD0 |
| 33 | O | A9 | 34 | O | A8 |
| 35 | - | GND | 36 | - | GND |
| 37 | - | +5V | 38 | - | +3V3 |
| 39 | - | +5V | 40 | - | +3V3 |

Fig. 2(B)

PLATFORM FOR SELECTIVELY PROVIDING A CHANNEL SERVICE UNIT/ DATA SERVICE UNIT, A ROUTER/BRIDGE, AND A DIAL-UP MODEM

FIELD OF THE INVENTION

The present invention relates to a universal modem platform which matches with the protocols of the telecomm and datacomm, and especially to a structure formed by a mother board and a plurality of baby boards, wherein through a bit-stream/PCM converter, a cross switch and high level data link controls, the present invention can be integrated as a router/bridge, a channel service unit/data service unit, or a dial-up modem in a single platform.

BACKGROUND OF THE INVENTION

In the field of data communication, LAN of user usually uses Router and CSU/DSU to connect to internet. Now many digital leased circuit are presented to solve to length and speed constrain of transmission, for example IDSN, T1, E1, xDSL (ADSL, HDSL2, SDSL, MSDSL . . . ) and so on.

Several customers need different types of Router, Bridge Modem or Channel Service Unit(CSU)/Data Service Unit (DSU).

CSU/DSU is usually provided by Operating Company as dedicate Modem access. The vendor of CSU/DSU need large effort and time to develop various CSU/DSU for various digital leased circuit and also specific operation and maintenance features to meet their administration requirement.

Router/Bridge Modem is to provide data network from LAN(Internet) to outside world (ex. Internet). The customers of these products may not be operating company. It could be for home user, Small Office and Home Office (SOHO) or enterprise user.

Basically, the features, users and market segment of Router/Bridge and CSU/DSU and totally different. CSU/DSU is most likely a product for telecommunication segment. Router/Bridge is for general users' data service. Usually, Router/Bridge and CSU/DSU are even totally different architecture for product development and different vendors to provide those products.

The following is the revolutionary platform architecture to combine CSU/DSU and Router/Bridge in one single platform. The platform can meet Operating Company's feature in Telecommunication field and meet general user requirements in Router/Bridge market segment. We call this platform as "Universal Modem Platform (UMP)".

By this common platform, the vendor could extend to have very wide.

2 Very wide range product

The UM will cover three cotalogs of products by using the same platform:
 CSU/DSU
 Router/Bridge
 Dial-up Modem
2.1 CSU/DSU product:
 MSDSL with v.35/RS449 (FIG. 2)
 SDSL with v.35/RS449 (FIG. 2)
 HDSL2 with v.35/RS449 (FIG. 2)
 IDSL with v.35/RS449 (FIG. 3)
 MSDSL with E1 (FIG. 4)
 SDSL with E1 (FIG. 4)
 HDSL2 with T1 (FIG. 5)
 FT1 with V.35/RS449 (FIG. 6)
 FE1 with V.35/RS449 (FIG. 6)
 FE1 with Drop/insert (FIG. 7)
 T1/E1 converter (FIG. 7)
2.2 Bridge/Router:
 Bridge/Router means to transit data from LAN (Ethernet) to WAN (Wide Area Network) interface. The WAN interfaces could be MSDSL, SDSL, HDSL2, IDSL, V.35/RS449, T1, E1 or other future WAN interface.
 MSDSL router (FIG. 8)
 SDSL router (FIG. 8)
 HDSL2 router (FIG. 8)
 IDSL router (FIG. 9)
 ADSL router (FIG. 10)
 V.35/RS449 router (FIG. 11)
 E1 router (FIG. 12)
 T1 router (FIG. 12)
 MSDSL & V.35/RS449 dual port router (FIG. 13)
 SDSL & V.35/RS449 dual port router (FIG. 13)
 HDSL2 & V.35/RS449 dual port router (FIG. 13)
 E1 & V.35/RS449 dual port router (FIG. 14)
 T1 & V.35/RS449 dual port router (FIG. 14)
 V.35/RS449 X2 dual port router (FIG. 15)
2.3 Dial-up Modem:
 Dial-up Modem means the product can hook up PC's COM port and use Microsoft's "Dial-up Network" to dial out and access to outside network (ex. Internet). The products could be
 IDSL dial-up modem
 MSDSL dial-up modem
 SDSL dial-up modem
 ADSL dial-up modem

SUMMARY OF THE INVENTION

Accordingly, the primary object of the present invention is to provide a universal modem platform which integrate a router/bridge and a channel service unit/data service unit for matching the protocols of telecomm and datacomm.

Another object of the present invention is to provide a universal modem platform with a cross switch to switch between the specifications of an input connector and an output connector.

A further object of the present invention is to provide a universal modem platform which reduce the developing cost in the router/bridge and channel service unit/data service unit.

In order to achieve objects, the present invention provide a universal modem platform, the router/bridge and CSU/DSU are integrated to a novel platform which is matched to the requirement of an operating company, and matched to the requirement of the router/bridge market. Therefore, the platform is call as a "universal modem platform". Many products can be expanded from this universal modem platform.

The universal modem platform comprises a mother board and a plurality of baby board slot connectors for connecting the mother board with a plurality of baby boards so as to be presents as a product selecting from one of the group of a the channel service unit/data service unit (CSU/DSU) series, or a router/bridge series, as a dial-up modem series.

The mother board is installed with a power source, an RS232 communication port, a 10/100M Ethernet, a bit-stream/PCM converter, a cross switch, high level data link controls, a universal asynchronous receiver/transmitter, a DRAM, a plurality of slot connectors and direct memory access interface cards, etc.

The baby board are selected from one of the xDSL interface cards, V.35/RS449 interface cards, T1/E1 interface cards, and T1/E1 drop/insert interface cards with conversion.

The channel service unit/data service unit (CSU/DSU) is formed as a product selecting from one of group of a MSDSL modem with V.35/RS449, a SDSL modem with V.35/RS449, a HDSL2 modem with V.35/RS449, a IDSL modem with V.35/RS449, a MSDSL modem of E1, a SDSL modem with E1, a HDSL2 modem with T1, a FT1 modem with V.35/RS449, a FE1 modem with V.35/RS449, EF1 modem with capturing and inserting function, and T1/E1 converter.

The router/bridge is formed as a product selecting from one of a group containing a MSDSL router, SDSL router, a HDSL2 router, a ADSL router, a V.35/RS449 router, a E1 router, a T1 router, an MSDSL and V.35/RS449 two port router, an SDSL and V.35/RS449 two port router, an HDSL2 and V.35/RS449 two port router, an E1 and V.35/RS449 two port router, a T1 and V.35/RS449 two port router, and two V.35/RS449 two port router.

The dial-up modem is formed as a product selecting from one of a group containing an IDSL dial-up modem, an MSDSL dial-up modem, a SDSL dial-up modem, and an ADSL dial-up modem.

BRIEF DESCRIPTION OF FIGURES

Embodiments of the present invention will hereinafter be described, by way of example, with reference to the accompanying drawings, in which:

FIG. 2B shows a table about the definition of the baby boards of the universal modem platform in the present invention.

DESCRIPTION OF PREFERRED EMBODIMENTS

Figure 1:
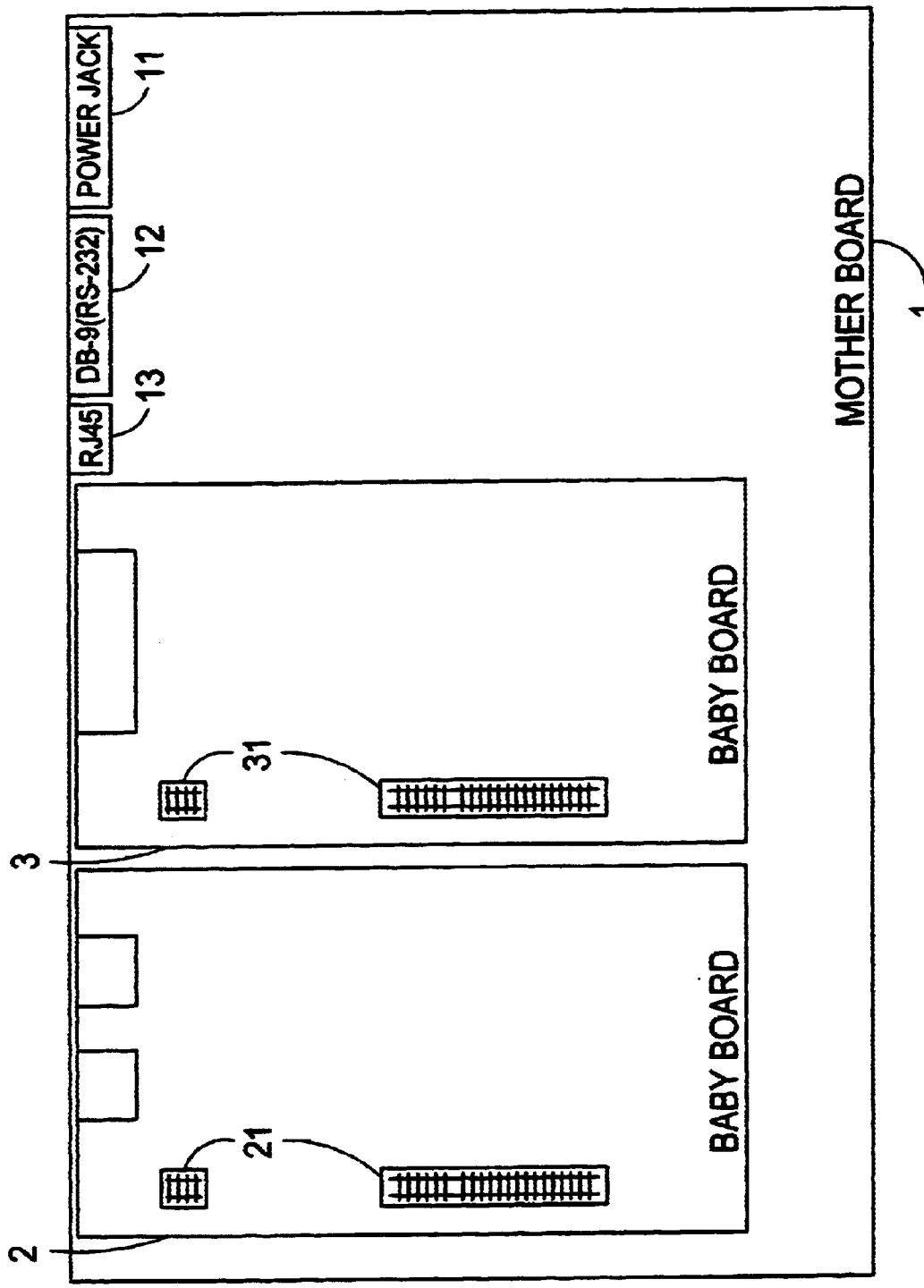
FIG. 1 shows the construction of the universal modem platform according to the present invention.

With reference to FIG. 1, the construction of the universal modem platform according to the present invention is illustrated herein. The universal modem platform of the present invention has two primaries parts, one part is a mother board 1, another part is at least one baby board 2. The mother board 1 is installed with a receptacle 11, an RS232 port 12, a RJ45 port 13, a bit-stream/PCM converter 14, a cross switch 15 and high level data link controls 16, 17 (briefly, called as "HDLC"). By two slot connectors 21, 31, the two baby boards 2, 3 is connected to the mother board 1 through the cross switch 15 and the bit-stream/PCM converter 14, or the high level data link controls 16 and 17, which are assembled as a channel service unit/data service unit (CSU/DSU), an router/bridge or a dial-up modem, and other products. The baby board 2, 3 are selected from one of the xDSL interface card, V.35/RS449 interface card, T1/E1 interface card, and T1/E1 drop/insert interface card with conversion. One of the interface cards can be selected, or two of the interface cards can be selected.

Figure 2A:
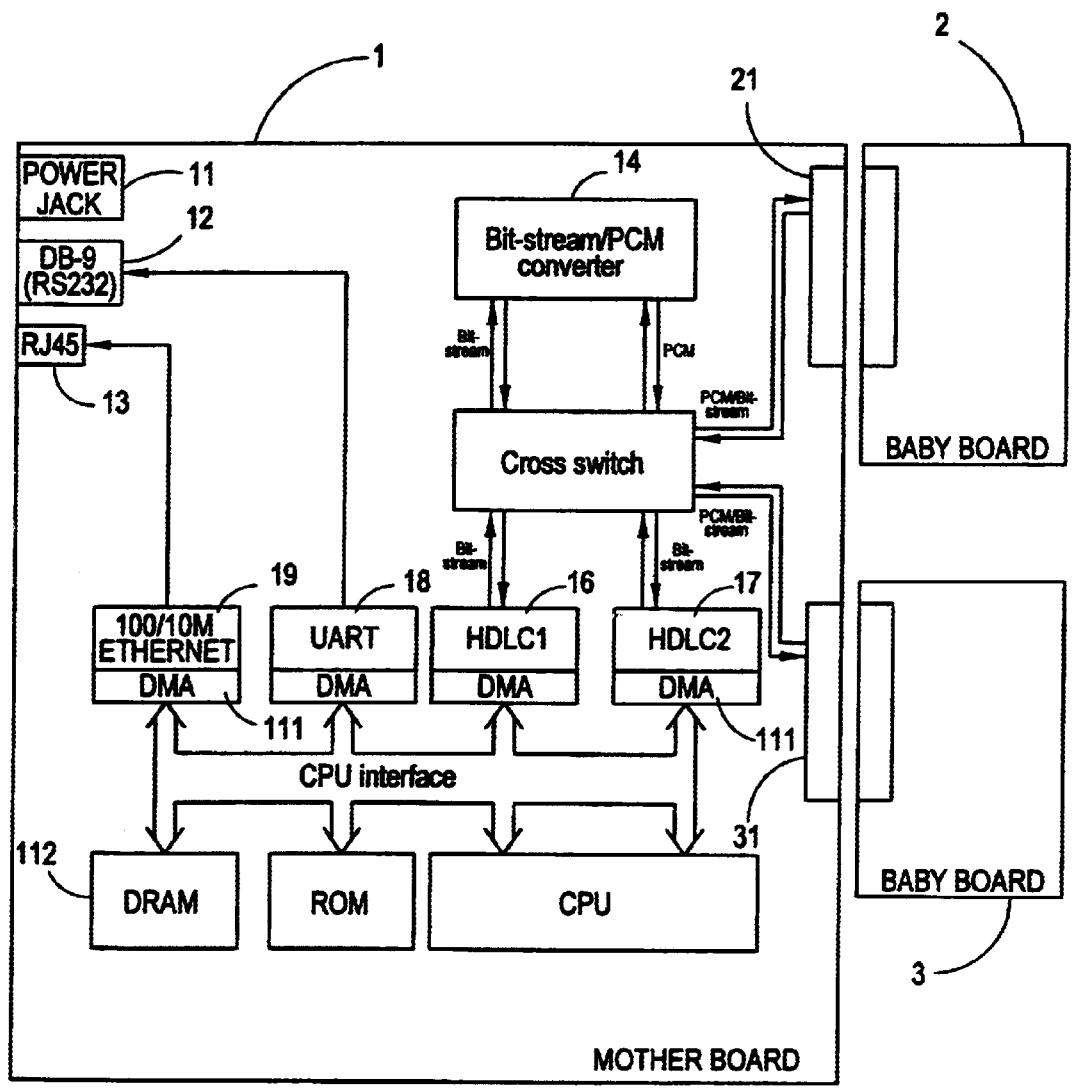
FIG. 2A shows the flow diagram of the circuit of mother board in the universal modem platform of the present invention.
Figure 3A:
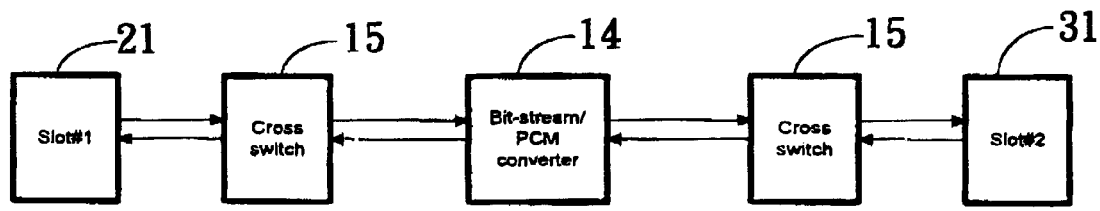
FIG. 3A shows the data flow diagram about the CSU/DSU of the universal modem platform in the present invention.
Figure 3B:
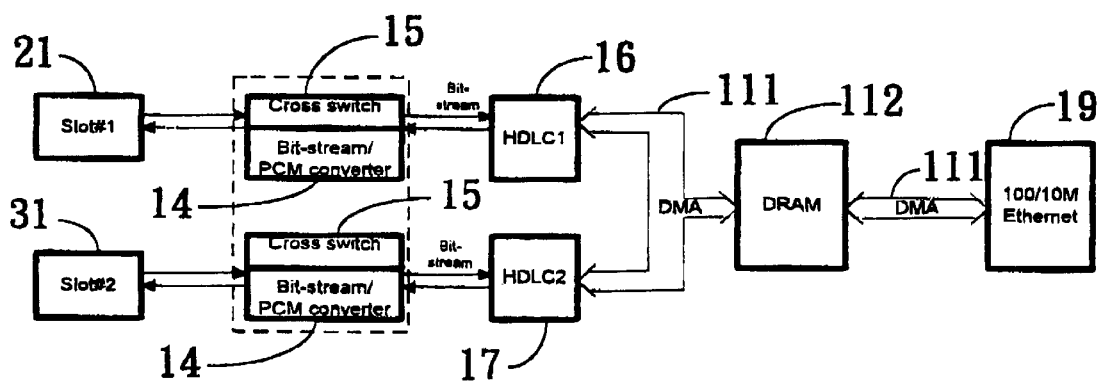
FIG. 3B shows a packet flow diagram of the router/bridge in the universal modem platform of the present invention.
Figure 3C:
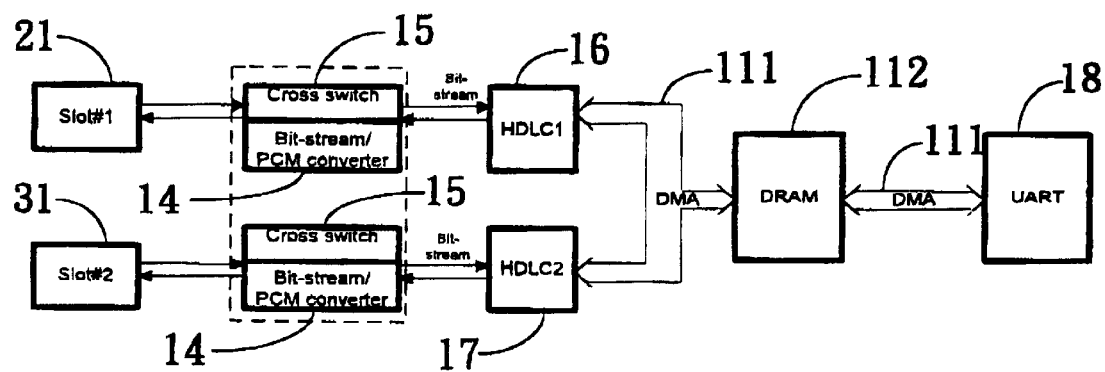
FIG. 3C is a packet flow diagram about the dial-up modem of the universal modem platform in the present invention.
Figure 4:
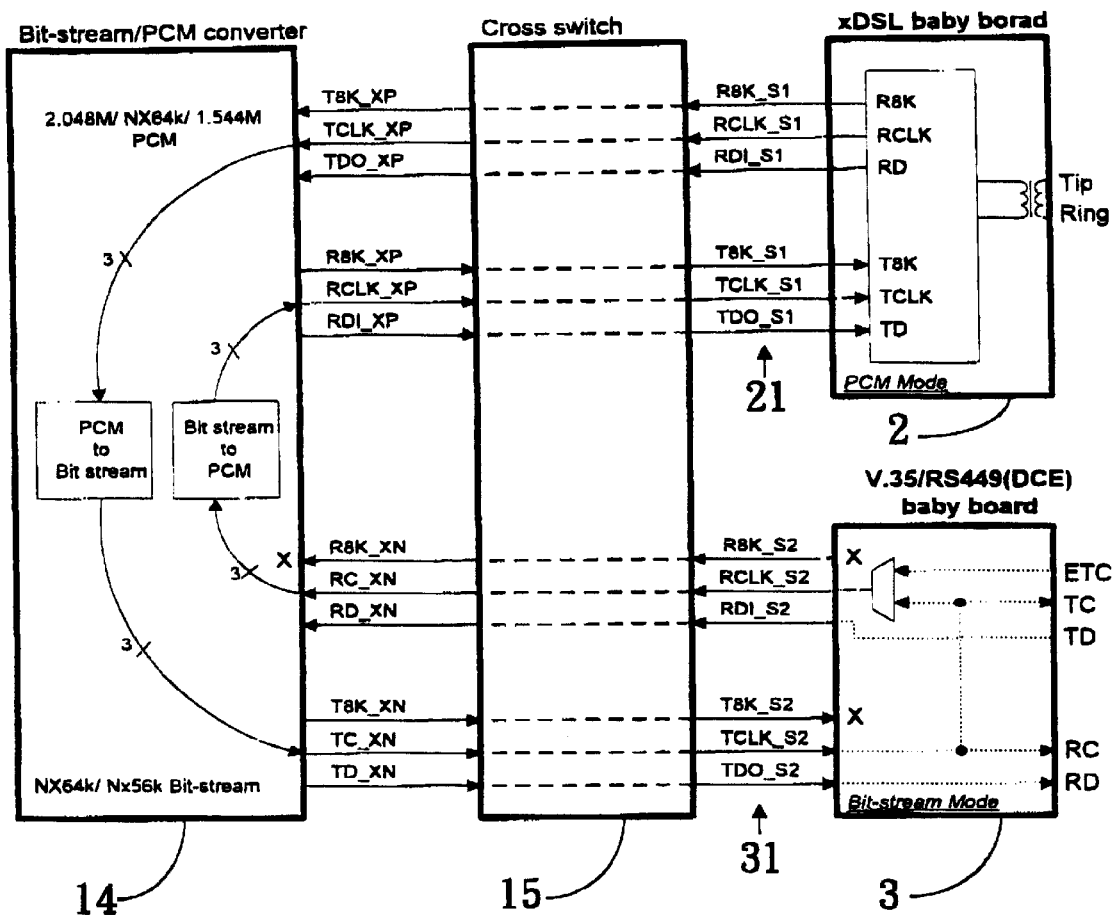
FIG. 4 is a block diagram about an embodiment of an xDSL CSU/DSU of V.35/RS449.
Figure 5:
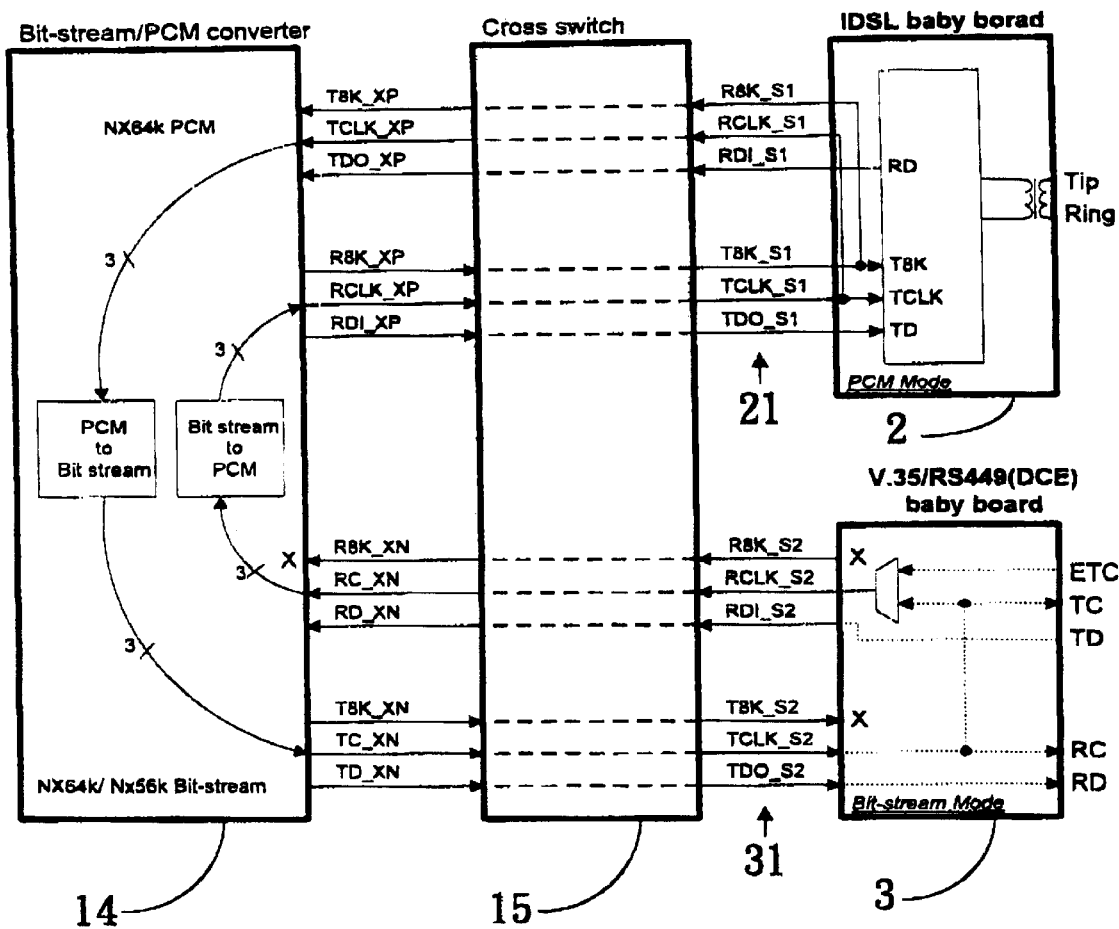
FIG. 5 is a block diagram about an embodiment of an IDSL CSU/DSU of V.35/RS449.
Figure 6:
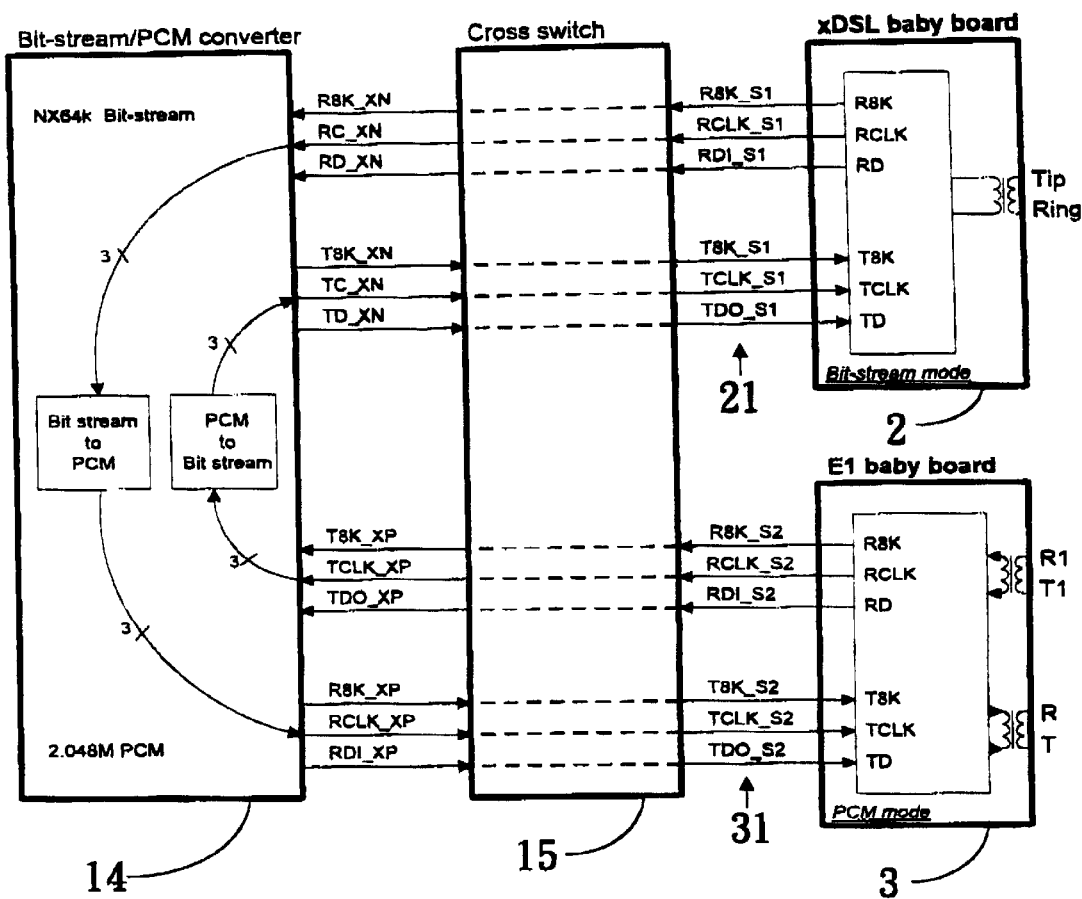
FIG. 6 is a block diagram about an embodiment of a xDSL CSU/DSU of E1.
Figure 7:
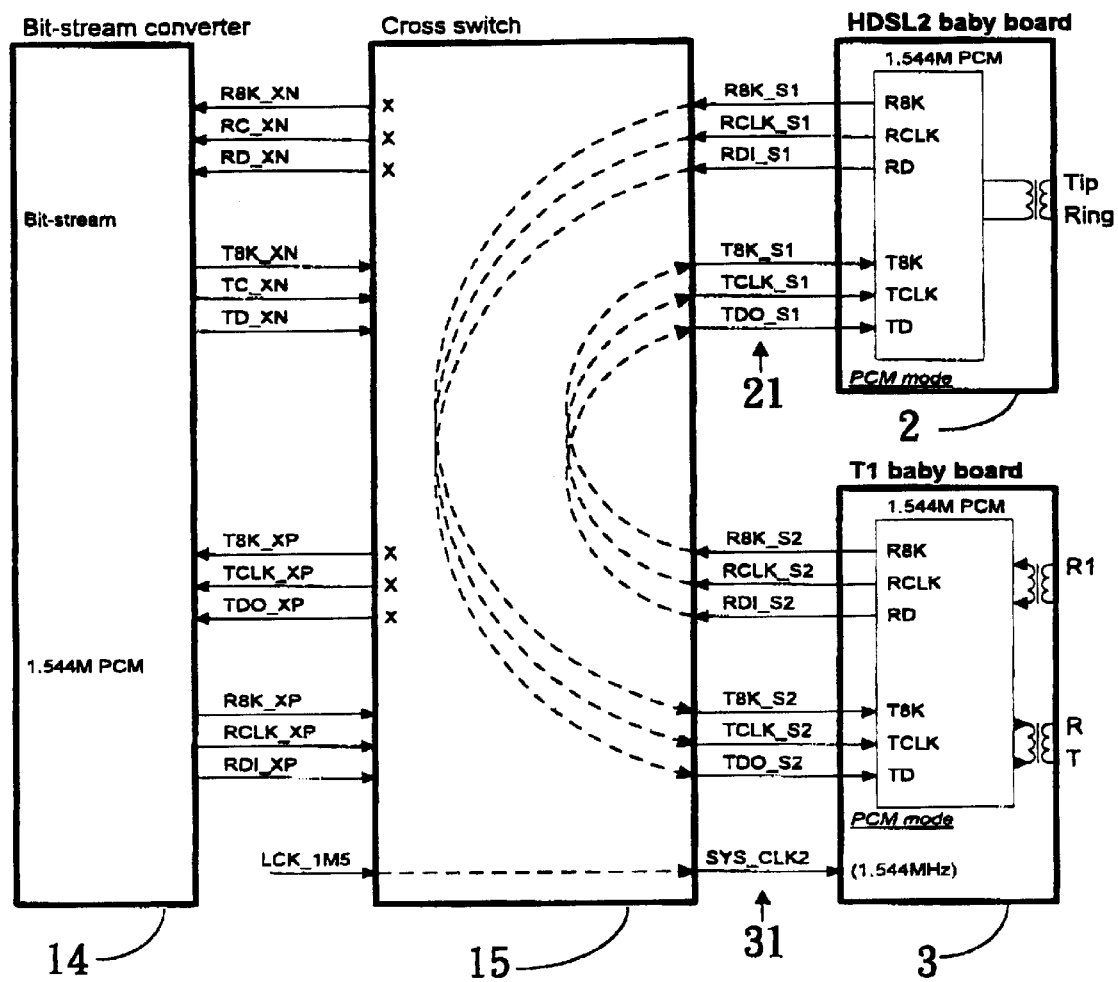
FIG. 7 is a block diagram about an embodiment of a HDSL2 CSU/DSU of T1.
Figure 8:
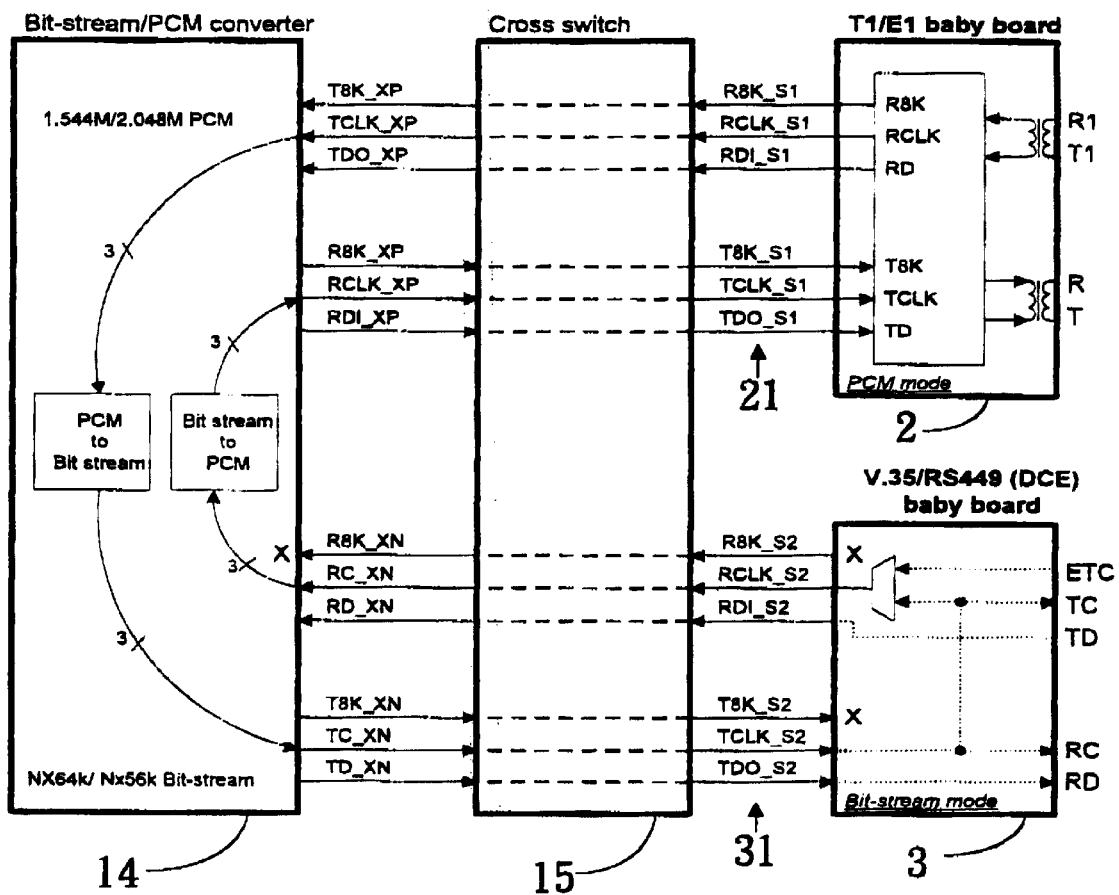
FIG. 8 is a block diagram about an embodiment of a T1/E1 CSU/DSU of a V.35/RS449.
Figure 9:
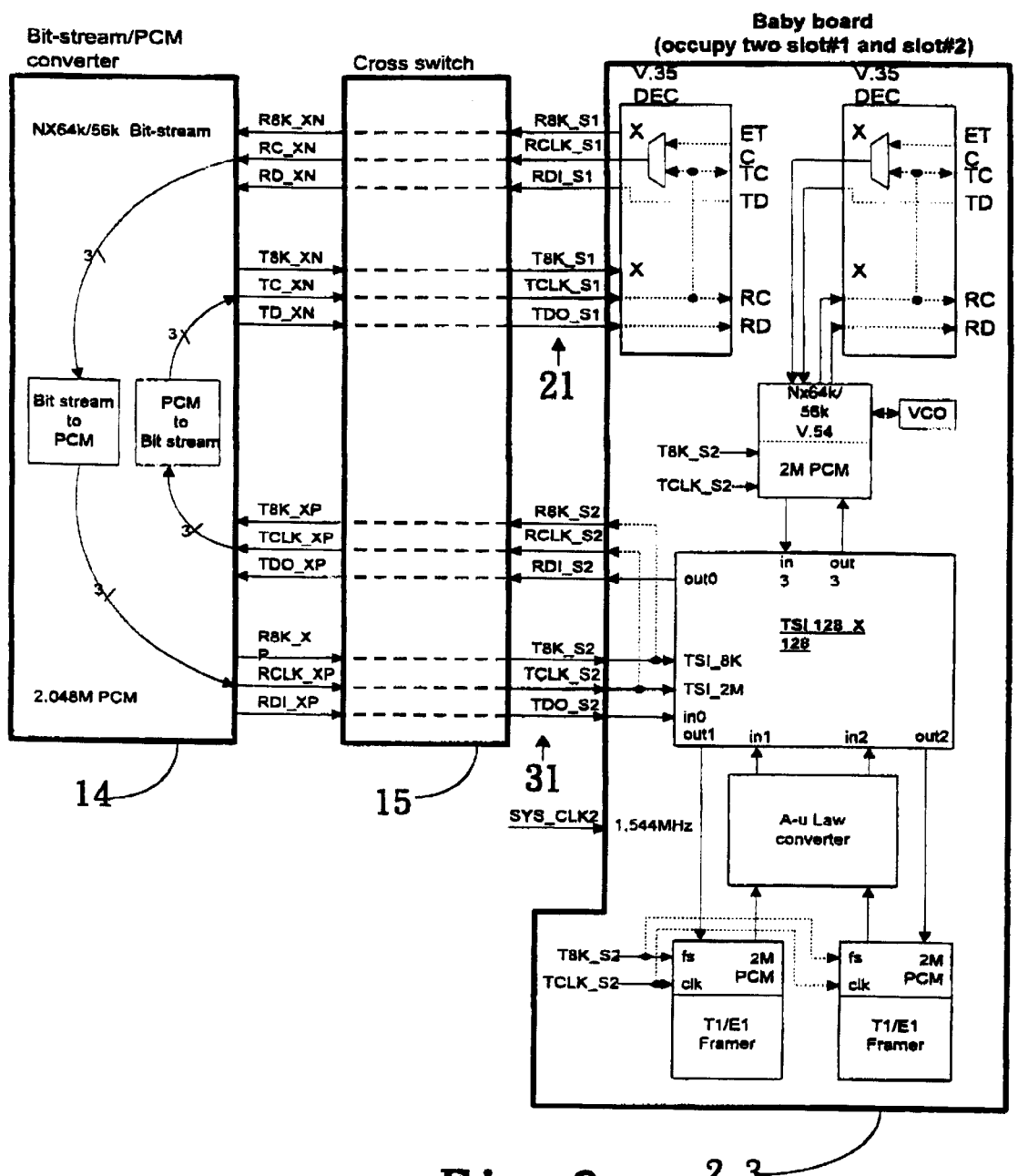
FIG. 9 shown the block diagram of the capturing and inserting T1/E1 CSU/DSU converter and double T1/E1 CSU/DSU of double V.35.
Figure 10:
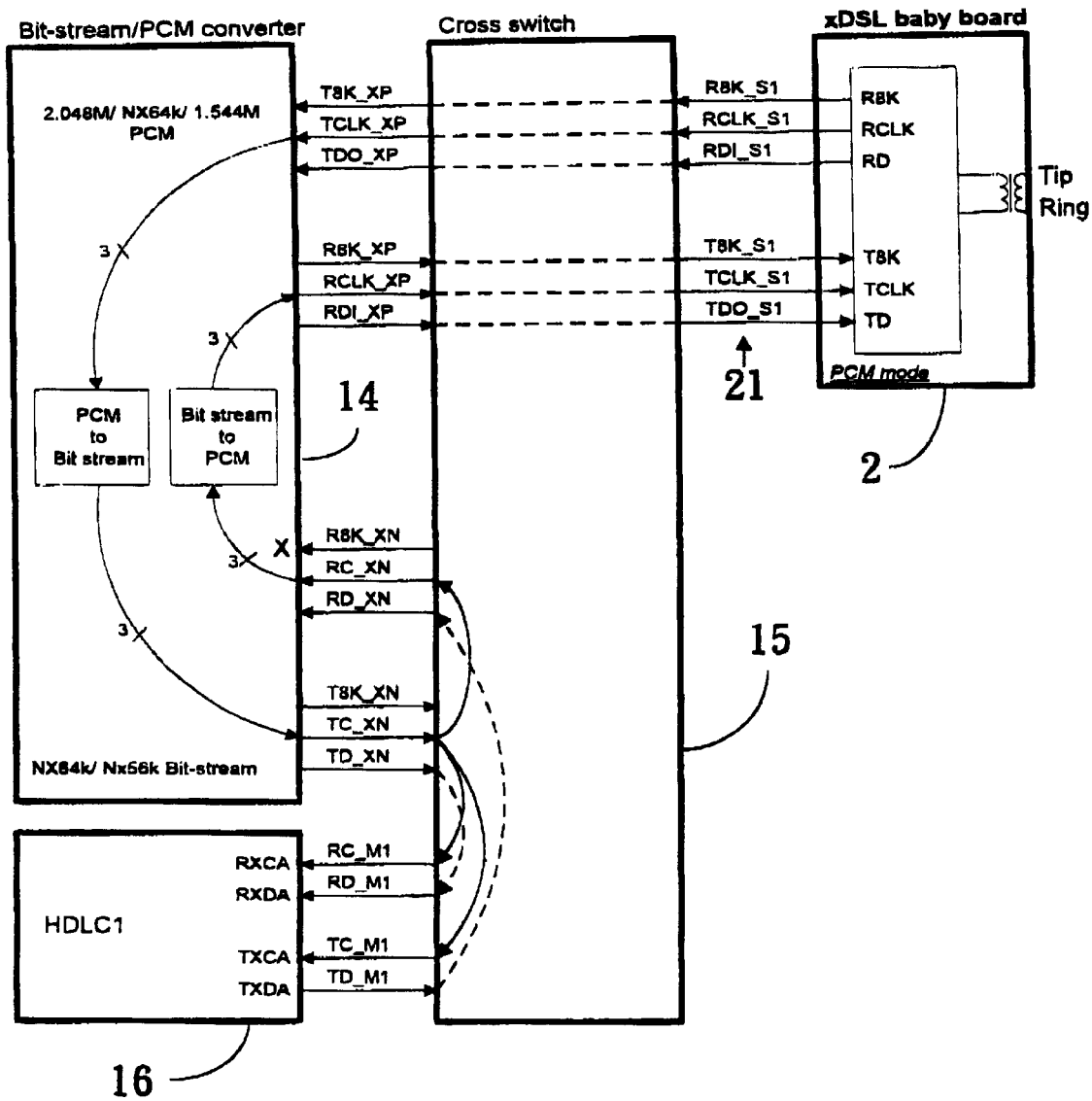
FIG. 10 shows the block wiring about the embodiment of a single port xDSL router/bridge.
Figure 11:
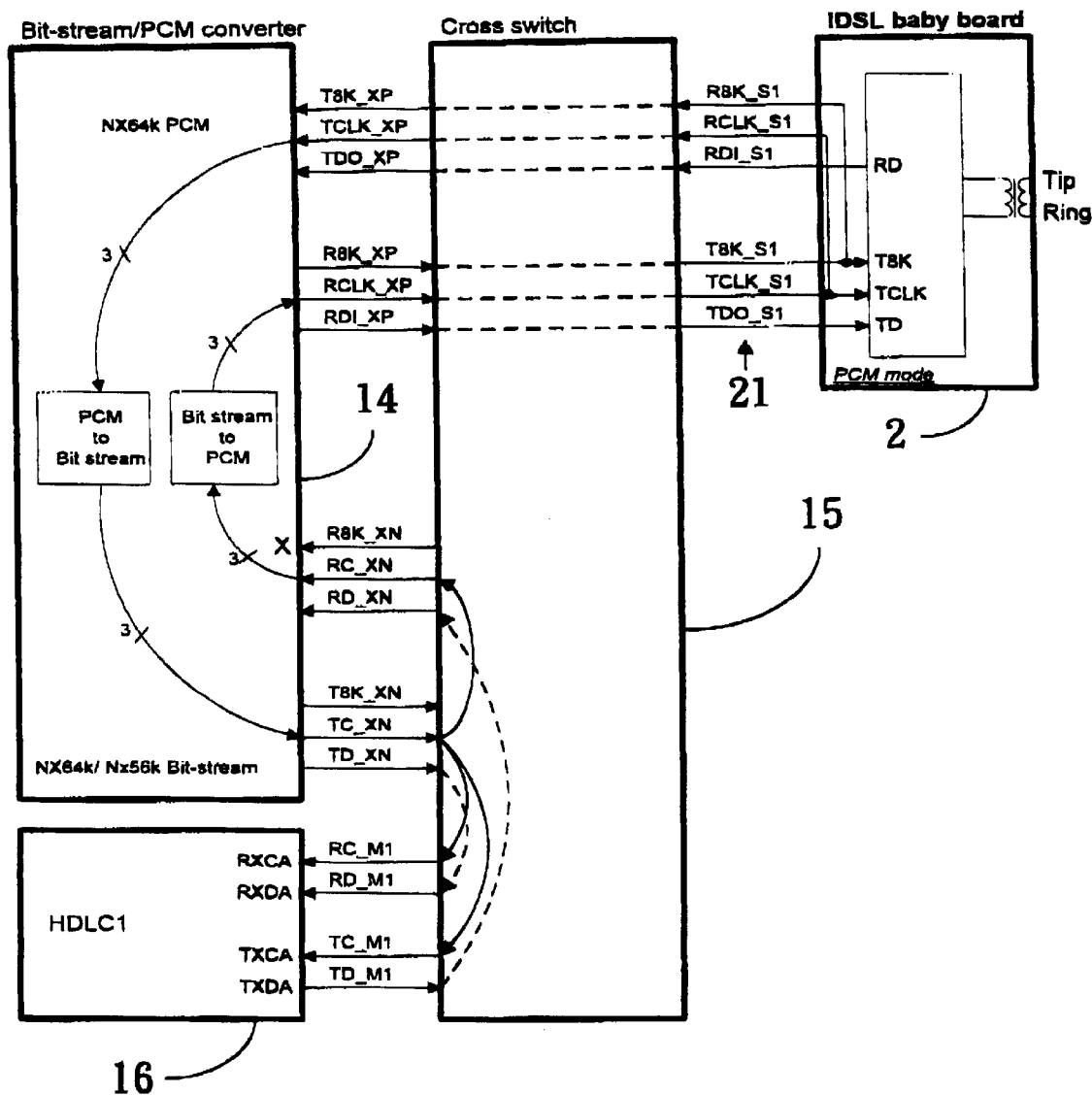
FIG. 11 shows the block wiring about the embodiment of a single port IDSL router/bridge.
Figure 12:
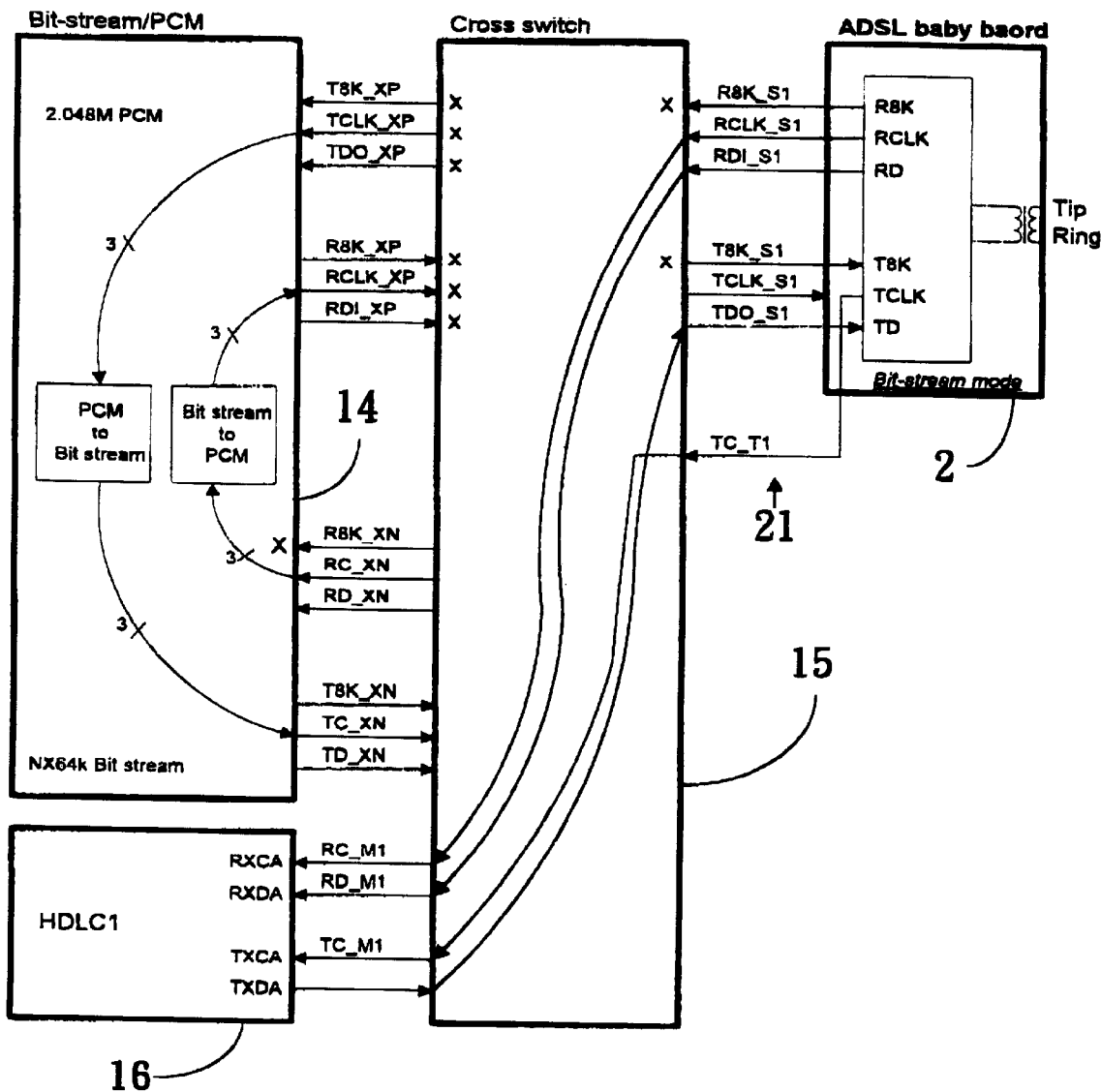
FIG. 12 shows the block wiring about the embodiment of a single port ADSL router/bridge.
Figure 13:
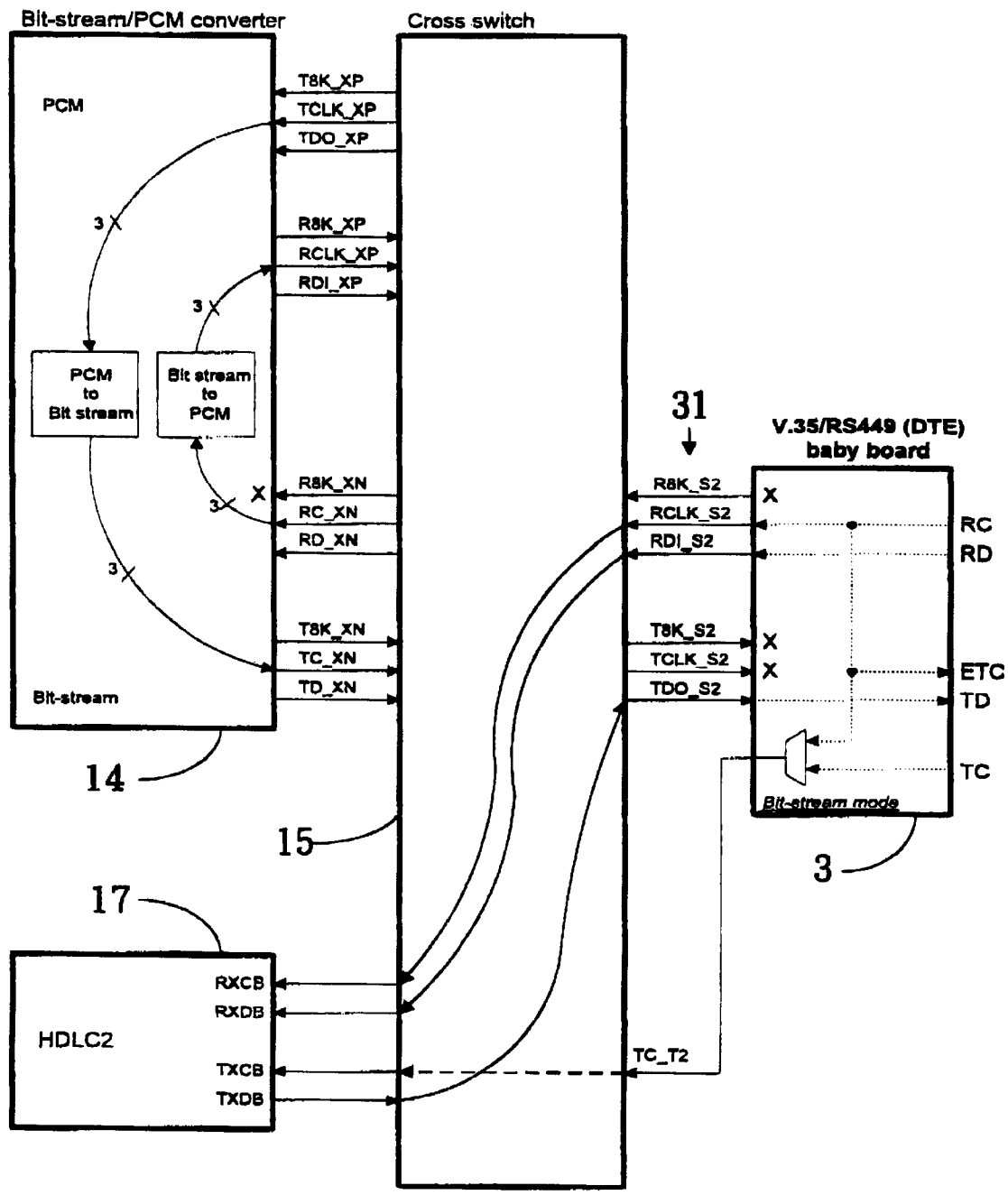
FIG. 13 shows the block wiring about the embodiment of a single port V.35/RS499 router/bridge.
Figure 14:
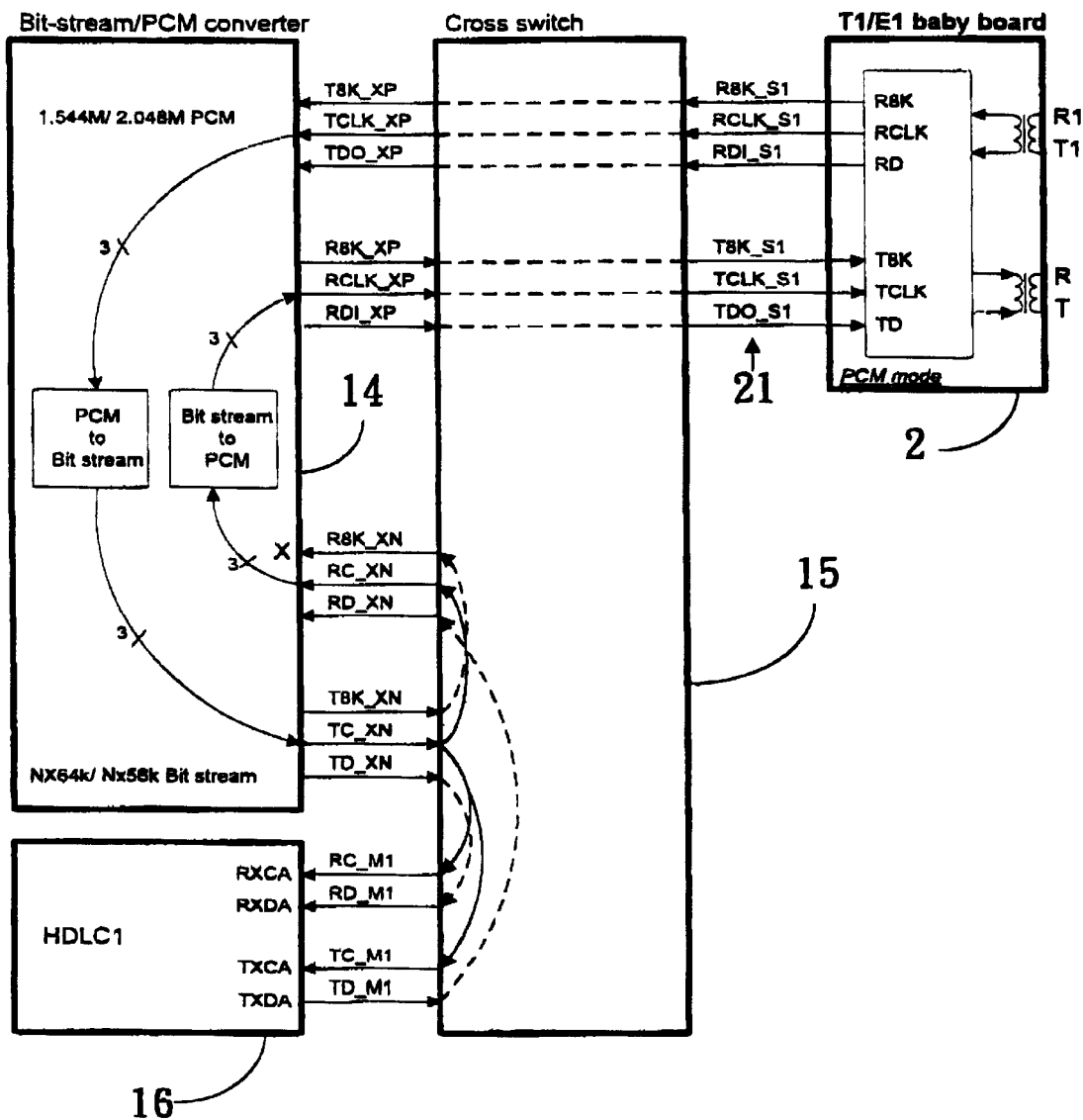
FIG. 14 shows the block wiring about the embodiment of a single port T1 E1 router/bridge.
Figure 15:
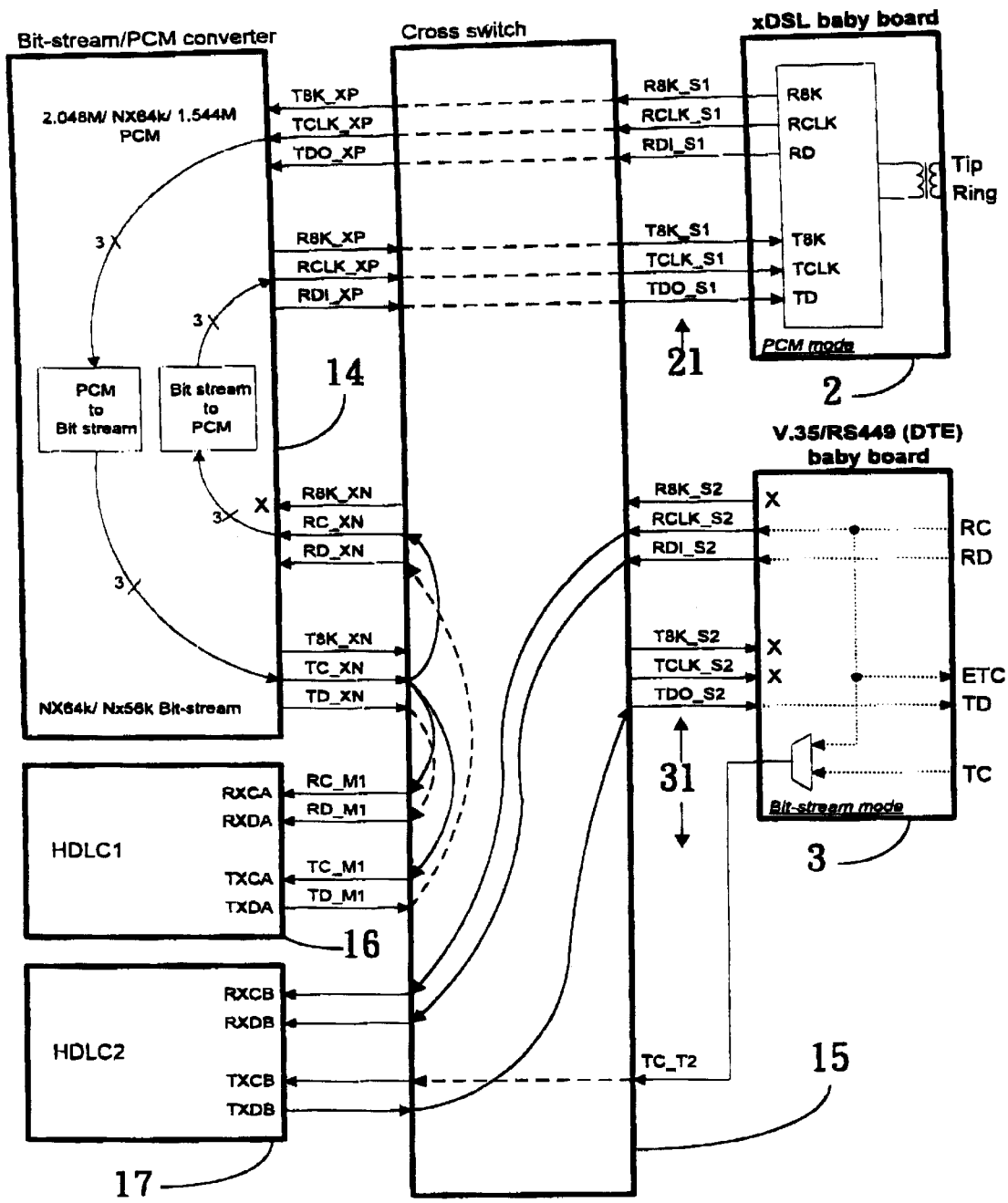
FIG. 15 shows the block wiring about the embodiment of a double port xDSL and V.35/RS499 router/bridge.
Figure 16:
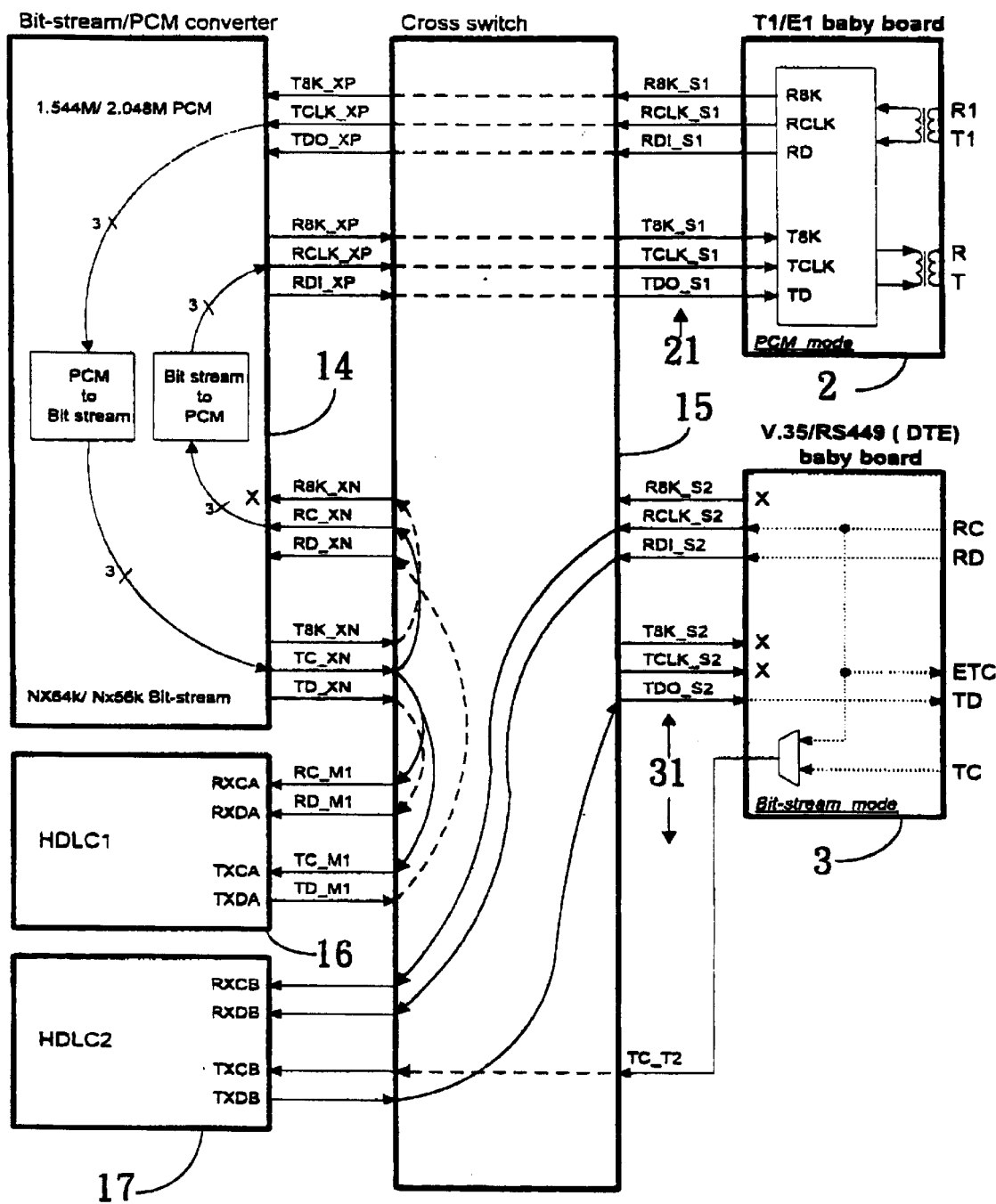
FIG. 16 shows the block wiring about the embodiment of a double port T1/E1 and V.35/RS499 router/bridge.
Figure 17:
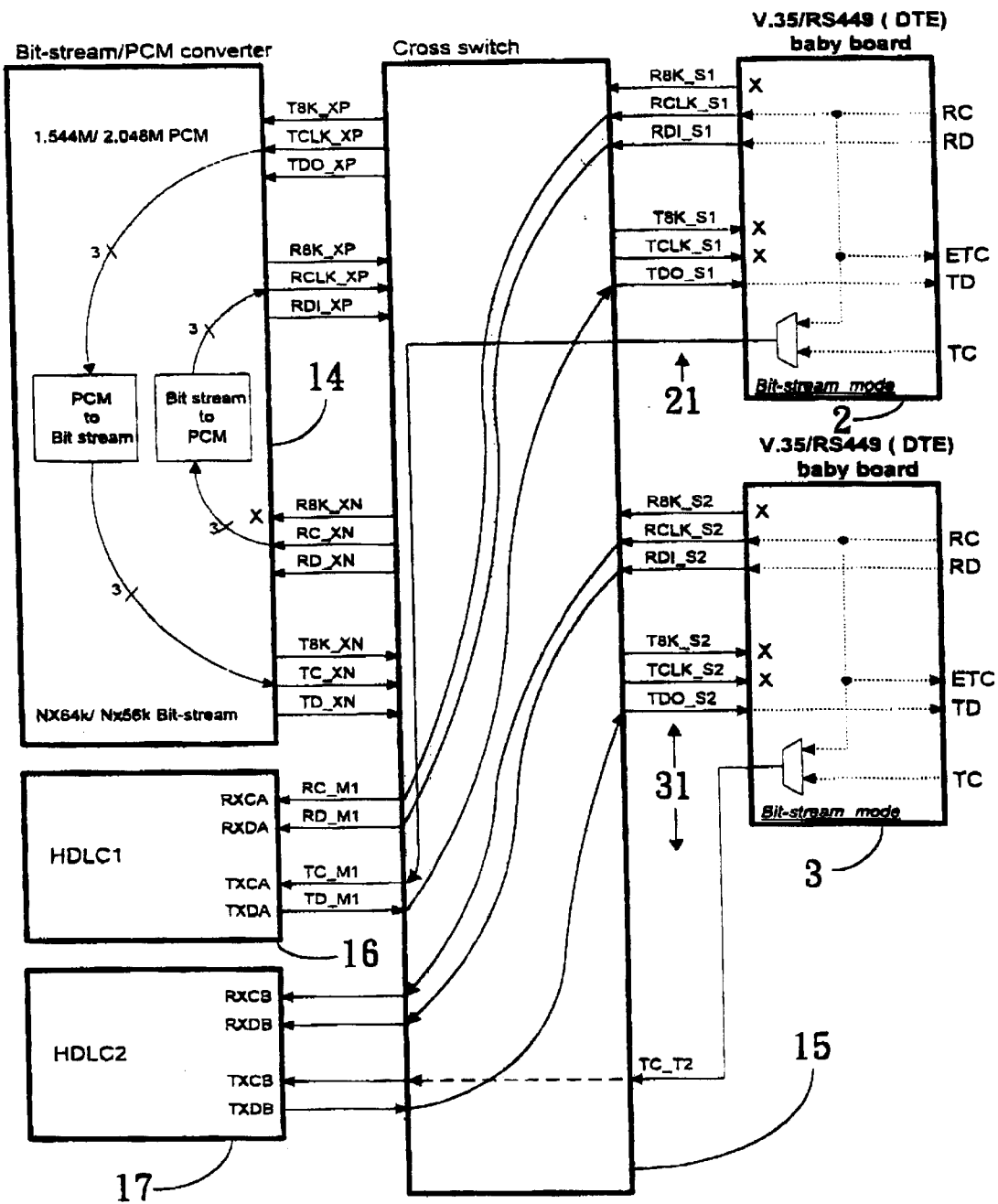
FIG. 17 shows the block wiring about the embodiment of a double port double V.35/RS499 router/bridge.

Referring to FIG. 2(A), the circuit block diagram of the universal modem platform according to the present invention is illustrated. In this circuit, the cross switch 15 serves to as an logic switching unit for connecting the bit-stream/PCM converter 14 to the two baby board slot connectors 12, 31. In general, according to the type of the baby boards 2, 3 being connected to the slot connectors 21, 31, it is determined whether the present invention serves to a CSU/DSU, an router/bridge, or a dial-up modem. If it is used in a CSU/DSU mode, referring to the CSU/DSU data flow diagram of FIG. 3A, data will communicate between the baby board slot connector 21 and baby board slot connector 31 through the cross switch 15 and the bit-stream/PCM converter 14. If it is in a router/bridge mode, referring to the router/bridge package flow diagram of FIG. 3B, data will communicated between the two slot connectors 21, 31 through the cross switch 15, bit-stream/PCM converter 14 and high level data link controls 16, 17 via an DRAM 112 and a 100/10M Ethernet in a direct memory access 111 way. If the universal modem platform of the present invention is acted in a dial-up modem mode, as shown in the dial-up modem package flow diagram of FIG. 3C, data will communicated between the two slot connectors 21, 31 through the cross switch 15, bit-stream/PCM converter 14 and high level data link controls 16, 17 via an DRAM 112 and an RS232 port 12 of the universal asynchronous receiver/transmitter 18 in a direct memory access 111 way.

With reference to FIG. 2B, the definition of the pins in the slot connectors of the universal modem platform is illustrated. In the universal modem platform of the present invention, the slot connectors 21, 31 of the mother board 1 has forty pins, wherein the first pin is a TDO_S output mode; the second pin is a TCLK_S output mode; the third pin is a T8K_S output mode; the fourth pin is a TC_T output mode; the fifth pin is a RDI_S output mode; the sixth pin is a RCLK_S output mode; the seventh pin is a R8K_S output mode; the eighth pin is a LOOP output mode; the ninth pin is not defined; the tenth pin is a SYS_CLK output mode; the eleventh pin is not defined; the twelfth pin is a EXIST# output mode; the thirteenth pin is not defined; the fourteenth pin is not defined; the fifteenth pin is a RST# output mode; the sixteenth pin is a INTI# output mode; the seventeenth pin is a ALE output mode; the eighteenth pin is a INTO# input mode; the nineteenth pin is a READY input mode; the twentieth pin is a CS2# output mode; the 21th pin is a WR# output mode; the 22th pin is a CS1# output mode; the 23th pin is a RD# output mode; the $24^{th}$ pin is a CS0# output mode; the $25^{th}$ pin is a AD7 input/output mode; the $26^{th}$ pin is an AD6 output/input mode; the $27^{th}$ pin is an AD5 output/input mode; the $28^{th}$ pin is an AD4 output/input mode; the $29^{th}$ pin is an AD3 output/input mode; the $30^{th}$ pin is an AD2 output/input mode; the 31th pin is an AD1 output/input mode; the 32th pin is an AD0 output/input mode; the 33th pin is an A9 output mode; the $34^{th}$ pin is an A8 output mode; the $35^{th}$ pin is a GND; the $36^{th}$ pin is a GND; the $37^{th}$ pin is at +5V; the $38^{th}$ pin is a +3V3; the $39^{th}$ pin is a GND; the $40^{th}$ pin is a +3V3, where the AD, ALE, WR#, RD#, CS, INT, RST#, and READY pins serves to connecting lines of a central processing interface; T8K_S, R8K_S, TCLK_S, RCLK_S, TDI_S, RDO_S, and TC_T pins serves as the connecting lines of the bit-stream/PCM converter interface; +5V, +3V3, and GND pins serves as power connecting lines; the SYS_CLK pin serves as a connecting line of the systematic clock; the LOOP pin serves as a connecting line for a loop clock; and the EXIST pin serves to check whether the baby boards are existed.

Referring to FIGS. 4 to 17, the embodiments of the application of the universal modem platform according to the present invention are illustrated. In the figures, the cross switch 15 in the mother board 1 is a key for forming the universal modem platform, which connects the functional blocks and the circuit signal lines in FIGS. 4 to 17. Thereby, the different function blocks can be embodied. The mother board 2 in FIGS. 4 to 17 primarily contains two circuit blocks, one is called as a bit-stream/PCM converter 14, while another is called as a cross switch 15. The products from the universal modem platform through the cross switch 15 includes the CSU/DSU and router/bridge. FIGS. 4 to 9 shows a block of CSU/DSU, in which all possible applications are included. In these applications, a cross switch 15 serves to electrically connect the components in the two baby boards 2, 3 to be formed as a closing loop. Therefore, the electric specifications of the two baby boards 2, 3 are communicated effectively. In the router/bridge blocks illustrated in FIGS. 10 to 17, by a cross switch 15, the bit-stream/PCM converter 14, high level data link controls 16, 17 and two baby boards 2, 3 are assembled as a close loop. Therefore, the components with different electric specifications can be communicated.

The universal modem platform of the present invention has the following advantage over the prior art:

1. Easily get into both telecommunication and data communication market segemet.

2. Save a lot of development effort, timing for all of the mentioned product range; in which one development produces over twenty products.

3. Save a lot of inventory risk because the same platform can be used to so wide product range. Avoid any loss when any one of the above products needs to be phased out.

It will also be appreciated that other modifications and variations may be made to the embodiments as described and illustrated within the scope of the present application as defined in the following claims.

We claim:

1. A universal modem platform comprising a mother board and a plurality of baby board slot connectors for connecting the mother board with a plurality of baby boards to function as a modem, the mother board includes a bit-stream/PCM converter, high level data link controls, a cross switch, data is converted through the bit-stream/PCM converter or the high level data link controls by a connection of the cross switch, wherein products selected from one of the group consisting of a channel service unit/data service unit (CSU/DSU) series, a router/bridge series, and a dial-up modem series are integrated in a single platform modem.

2. The universal modem platform as claimed in claim 1, wherein the mother board has a power source, an RS232 communication port, a 10/100M Ethernet, a universal asynchronous receiver/transmitter, a DRAM, and direct memory access interface cards.

3. The universal modem platform as claimed in claim 2, wherein the bit-stream/PCM converter or the cross switch are formed by logic circuits; subsequent to specific parameters being input to the mother board from the baby boards, the cross switch connects the signals of the baby boards with the signals of the bit-stream/PCM converter or the high level data link controls, to provide a product selected from one of the group consisting of the channel service unit/data service unit (CSU/DSU) series, and the router/bridge series.

4. The universal modem platform as claimed in claim 2, wherein the baby board slot connectors each have forty pins, a first pin is a TDO_S output mode; a second pin is a TCLK_S output mode; a third pin is a T8K_S output mode; a fourth pin is a TC_T output mode; a fifth pin is a RDI_S output mode; a sixth pin is a RCLK_S output mode; a seventh pin is a R8K_S output mode; an eighth pin is a LOOP output mode; a ninth pin is not defined; a tenth pin is a SYS_CLK output mode; an eleventh pin is not defined; a twelfth pin is a EXIST# output mode; a thirteenth pin is not defined; a fourteenth pin is not defined; a fifteenth pin is a RST# output mode; a sixteenth pin is a INTI# output mode; a seventeenth pin is a ALE output mode; an eighteenth pin is a INTO# input mode; a nineteenth pin is a READY input mode; a twentieth pin is a CS2# output mode; a twenty-first pin is a WR# output mode; a twenty-second pin is a CS1# output mode; a twenty-third pin is a RD# output mode; a twenty-fourth pin is a CS0# output mode; a twenty-fifth pin is a AD7 input/output mode; a twenty-sixth pin is an AD6 output/input mode; a twenty-seventh pin is an AD5 output/input mode; a twenty-eighth pin is an AD4 output/input mode; a twenty-ninth pin is an AD3 output/input mode; a thirtieth pin is an AD2 output/input mode; a thirty-first pin is an AD1 output/input mode; a thirty-second pin is an AD0 output/input mode; a thirty-third pin is an A9 output mode; a thirty-fourth pin is an A8 output mode; a thirty-fifth pin is a GND; a thirty-sixth pin is a GND; a thirty-seventh pin is at +5V; a thirty-eighth pin is a +3V3; a thirty-ninth pin is a GND; a fortieth pin is a +3V3.

5. The universal modem platform as claimed in claim 1, wherein the baby boards are each selected from one of a xDSL interface card, a V.35/RS449 interface card, a T1/E1 interface card, and a T1/E1 drop/insert interface card with conversion.

6. The universal modem platform as claimed in claim 1, wherein the channel service unit/data service unit (CSU/DSU) is formed by the bit-stream/PCM converter, a the cross switch of the mother board, and the baby boards; wherein data is communicated between the baby boards through the bit-stream/PCM converter and the cross switch.

7. The universal modem platform as claimed in claim 1, wherein the router/bridge is formed by the bit-stream/PCM converter, the cross switch, the high level data link controls, a DRAM, a 100/10M Ethernet, and the baby boards of the mother board; wherein data is communicated between the baby boards through the cross switch, the bit-stream/PCM converter, and the high level data link controls using direct memory access of the DRAM.

8. The universal modem platform as claimed in claim 1, wherein the dial-up modem is formed by the bit-stream/PCM converter, the cross switch, the high level data link controls, a DRAM, a universal asynchronous receiver/transmitter, and the baby boards; wherein data from the plurality of the baby boards are communicated with an RS232 port of the universal asynchronous receiver/transmitter through the cross switch, the bit-stream/PCM converter, and the high level data link controls using direct memory access of the DRAM.

* * * * *